United States Patent [19]

Laughlin

[11] Patent Number: 5,647,033
[45] Date of Patent: Jul. 8, 1997

[54] APPARATUS FOR SWITCHING OPTICAL SIGNALS AND METHOD OF OPERATION

[76] Inventor: Richard H. Laughlin, 1906 Campbell Trail, Richardson, Tex. 75082

[21] Appl. No.: 443,785

[22] Filed: May 18, 1995

Related U.S. Application Data

[62] Division of Ser. No. 251,837, May 27, 1994, Pat. No. 5,444,801.

[51] Int. Cl.$^6$ .............................. G02B 6/26; G02B 6/42
[52] U.S. Cl. .................................................. 385/16
[58] Field of Search .................... 385/16, 18; 250/227.16

[56] References Cited

U.S. PATENT DOCUMENTS

| | | | |
|---|---|---|---|
| 3,649,105 | 3/1972 | Treuthart | 385/16 |
| 4,249,814 | 2/1981 | Hull et al. | 354/154 |
| 4,303,302 | 12/1981 | Ramsey et al. | 385/16 |
| 4,498,730 | 2/1985 | Tanaka et al. | 385/16 |
| 4,613,203 | 9/1986 | Proetel et al. | 350/6.6 |
| 4,626,066 | 12/1986 | Levinson | 385/16 |
| 4,657,339 | 4/1987 | Fick | 385/16 |
| 4,714,326 | 12/1987 | Usui et al. | 350/485 |
| 4,738,500 | 4/1988 | Grupp et al. | 350/6.6 |
| 4,790,621 | 12/1988 | Calaby et al. | 385/16 |
| 4,796,263 | 1/1989 | Rampolla | 372/10 |
| 4,814,600 | 3/1989 | Bergstrom | 250/221 |
| 4,838,637 | 6/1989 | Torok et al. | 385/16 |
| 4,927,225 | 5/1990 | Levinson | 385/16 |
| 5,031,987 | 7/1991 | Norling | 385/16 |
| 5,199,088 | 3/1993 | Magel | 385/16 |
| 5,204,922 | 4/1993 | Weir et al. | 385/18 |
| 5,208,880 | 5/1993 | Riza et al. | 385/16 |
| 5,221,987 | 6/1993 | Laughlin | 359/222 |
| 5,436,986 | 7/1995 | Tsai | 385/16 |

*Primary Examiner*—Akm E. Ullah
*Attorney, Agent, or Firm*—Baker & Botts, L.L.P.

[57] ABSTRACT

The present invention provides an apparatus (74 & 200) for switching an optical signal from an input optical fiber (210) to one of a plurality of output optical fibers (214 & 216). The apparatus (74 & 200) includes a collimator (76) for collimating an input optical signal into a collimated beam (216) at an angle with respect to a reference and a decollimator (78) for focusing the collimated beam to an output optical signal (220). The present invention also includes a reflector (92, 208, 218, & 222) for reflecting the collimated beam. The reflector (92 & 208) has a plurality of positions for changing the angle of the collimated beam (216) with respect to the reference so that the output optical signal (220) is focused on one of the plurality of output optical fibers (214 & 216).

35 Claims, 11 Drawing Sheets

APPARATUS FOR SWITCHING OPTICAL SIGNALS AND METHOD OF OPERATION

CROSS REFERENCE TO RELATED APPLICATIONS

This application is a divisional application of U.S. application Ser. No. 08/251,837, filed May 27, 1994 now U.S. Pat. No. 5,444,801 and entitled "Apparatus for Switching Optical Signals and Method of Operation".

TECHNICAL FIELD OF THE INVENTION

This invention relates in general to the field of optical processing systems, and more particularly to optical switches used in fiber optic networks.

BACKGROUND OF THE INVENTION

In fiber optic systems, various methods have been previously developed for switching optical signals between fiber optic cables. These previously developed methods can be classified into three categories: electrical, solid-state, and mechanical.

Electrical switches convert an optical signal to an electrical signal and then switch the electrical signal by conventional switching techniques. Electrical switches then convert the electrical signal back into an optical signal. Electrical switching of optical signals is faster then when using existing mechanical switches, but is also significantly more expensive. Additionally, electrical switching of optical signals is bandwidth limited, i.e., a converted electrical signal cannot "carry" all of the information in an optical signal. This limitation prevents electrical switching of optical signals from utilizing the full optical bandwidth available with fiber optics, and severely limits the advantages available when using fiber optics.

Solid-state optical signal switches typically use titanium diffused lithium niobate devices. Solid-state switches have fast switching speeds, less than one nanosecond, and the same bandwidth capacity as fiber optics. Solid-state switches, however, cost 30 to 100 times more than existing mechanical switches and have insertion losses exceeding 20 times those for existing mechanical switches.

Previously developed mechanical switches for switching optical signals are typically lower in cost than electrical or solid-state optical switches, provide low insertion loss, and are compatible with the bandwidth of fiber optics. Currently available optical mechanical switches, however, are relatively slow, with switching speeds of approximately 5 to 50 ms.

The actuators used in some existing mechanical switches result in their slow switching speed. Previously developed optical mechanical switches typically move mirrors or prisms or rotate the fiber to change the signal path for an optical signal. Alternatively, existing mechanical switches change a signal's path by moving the input fiber itself to align with the desired output fiber. Both of these techniques require moving large masses (mirrors or prisms) in a minimum time period. Existing optical mechanical switches may use solenoids and motors or piezo-electric transducers as the actuators.

Recent developments in network systems, such as SONET and asynchronous transfer mode (ATM) packet switching systems, require optical signal switching speeds of 10 µs or less. This speed is approximately 1,000 times faster than available through previously developed optical mechanical switches. Therefore, in order to obtain the benefits of fiber optic networks, more expensive electrical or solid-state switches must be used. Additionally, electrical and solid-state fiber optic switches experience losses that affect network function.

SUMMARY OF THE INVENTION

Therefore, a need has arisen for a switch for coupling optical signals between fiber optics that eliminates the problems associated with previously developed optical switches.

A need has arisen for a low cost, reliable, fast optical mechanical switch for coupling optical signals between optical fibers.

An additional need exists for a fiber optic switch having sufficient isolation between channels.

Yet another need exists for a fiber optic switch with a switching speed of approximately 10 µs or less.

In accordance with the present invention, a fiber optic switch is provided that substantially eliminates or reduces disadvantages and problems associated with previously developed optical signal switching devices and techniques.

One aspect of the present invention provides an apparatus for switching an optical signal from an input optical fiber to one of a plurality of output optical fibers. The apparatus includes a collimator for collimating an input optical signal into a collimated beam at an angle with respect to a reference and a decollimator for focusing the collimated beam to an output optical signal. The present invention also includes a reflector for reflecting the collimated beam. The reflector has a plurality of positions for changing the angle of the collimated beam with respect to the reference so that the output optical signal is focused on one of the plurality of output optical fibers.

Another aspect of the present invention provides an apparatus for switching a plurality of optical signals from a plurality of input optical fibers to a plurality of output optical fibers. The apparatus includes a collimator for collimating each input optical signal into a collimated beam at an angle with respect to a reference and a decollimator for focusing each collimated beam to an output optical signal. The apparatus further includes a reflector for reflecting each collimated beam. The reflector has a plurality of positions for changing the angle of each collimated beam with respect to its reference so that each output optical signal is focused on one of the plurality of output optical fibers.

Yet another aspect of the present invention provides a method for switching an optical signal from an input optical fiber to one of a plurality of output optical fibers. The method includes collimating the input optical signal into a collimated beam at an angle with respect to a reference, and then changing the angle of the collimated beam by an amount. The collimated beam is then decollimated and focused after its angle has been changed to one of the plurality of output optical fibers. Each amount the angle of the beam changes corresponds to switching the collimated beam to a different output optical fiber.

The present invention provides numerous technical advantages. A technical advantage of the present optical switch is its low cost in comparison to existing optical switches.

The present fiber optic switch provides an additional technical advantage of a fast switching speed, at approximately 10 µs for one embodiment of the invention.

The present switch provides a technical advantage of being configurable into different types of switches, including one fiber to several fibers or several fibers to several other fibers. The present switch can be configured as a reversing bypass or cross-bar switch. The present switch may be also cascaded to provide a large switch array for switching optical signals in a network.

The present optical switch is a reflective surface based system having less components than previously developed optical mechanical switches, and therefore, is less expensive to build.

The present switch may be manufactured using existing materials and techniques that contribute to its technical advantage of low cost.

Yet another technical advantage of the present switch is its low insertion loss, typically less than 1 dB. The isolation provided by the present switch eliminates cross-talk in a network employing the present switch.

The present switch provides a technical advantage of being suitable with many applications of fiber optics. It may be integrated into SONET or ATM networks to provide low cost switching.

Yet another technical advantage of the present optical switch is that it may be used as a variable beam splitter, attenuator, or modulator.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein.

DETAILED DESCRIPTION OF THE INVENTION

Preferred embodiments of the present invention are illustrated in the figures, like numerals being used to refer to corresponding parts of the various drawings.

Figure 1:
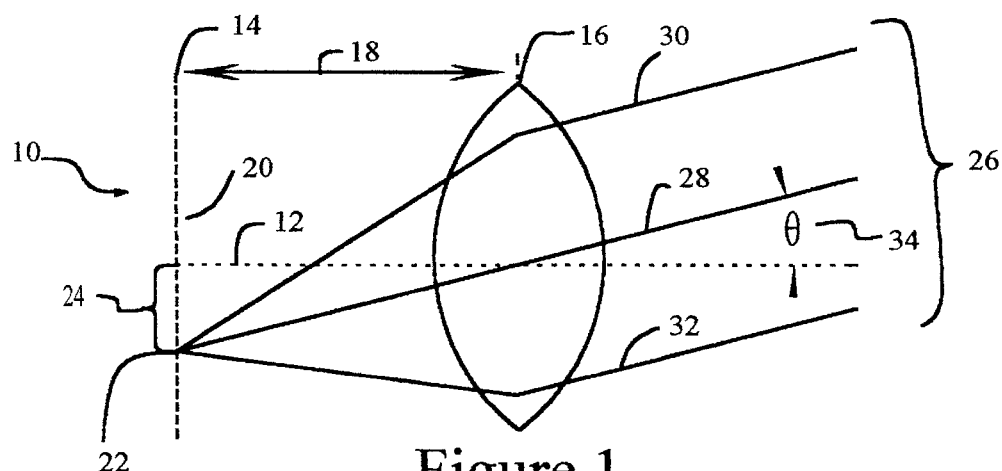
FIG. 1 illustrates the collimation of a beam.

FIG. 1 illustrates the collimation of a beam with a lens and is helpful in understanding the theory and operation of the present switch. FIG. 1 includes grid 10 having X-axis 12 and Y-axis 14 for reference only. Collimator or lens 16 is positioned along X-axis 12 at a distance 18 from Y-axis 14 at the focal length for lens 16. Focal plane 20 for lens 16 is nominally shown in FIG. 1 on Y-axis 14. FIG. 1 also includes an image originating at point 22 along focal plane 20 for lens 16. The image at point 22 is displaced from X-axis 12 by displacement 24.

The image at point 22 is collimated into parallel beams 26 by lens 16. Parallel beams 26 include center beam 28, top beam 30, and lower beam 32, shown for illustrative purposes only. Lens 16 encodes the spatial position or displacement 24 with reference to X-axis 12 of point 22 in focal plane 20 to angle θ 34. The spatial position of the image at point 22 defines angle θ 34 of collimated beams 26. Angle θ 34 may be defined by the relationship:

$$\theta = \arctan\left(\frac{\text{displacement 24}}{\text{focal length 18}}\right) \quad (1)$$

Therefore, the spatial position of point 22 defines the angle θ 34 of beams 26 with respect to optical X-axis 12.

Figure 2:
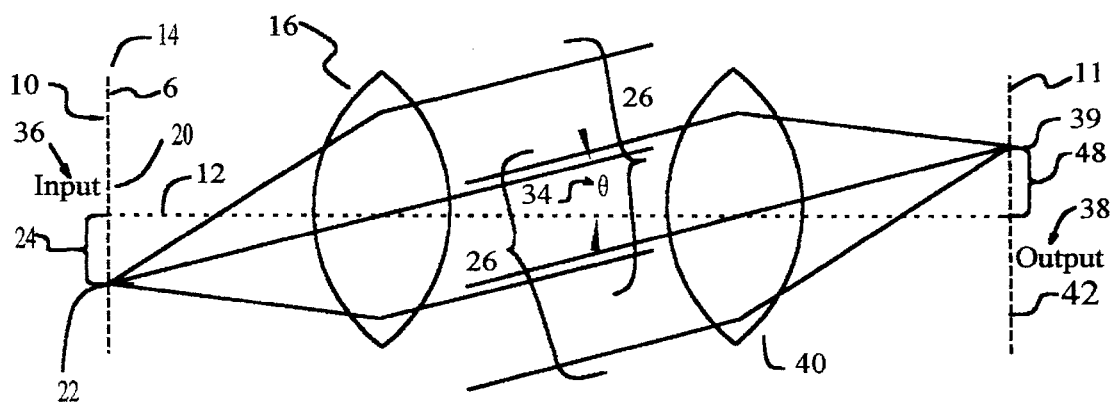
FIG. 2 shows the collimation and decollimation of a beam to shift the spatial location of an image.

FIG. 2 shows two collimating lenses placed back to back for transferring an input image at point 22 of input 36 to output 38 at point 39. FIG. 2 includes lens 16 of FIG. 1 and decollimator or lens 40 also positioned along X-axis 12. Lens 40 decollimates parallel beams 26 and decodes the angle of the collimated beams back to a displacement when lens 40 focuses the beams at point 39 on focal plane 42 associated with lens 40.

Lenses 16 and 40 placed back to back act as a conventional imaging lens with their magnification equal to the ratio of their focal lengths. When the focal lengths of lenses 16 and 40 are equal, there is no magnification, rather the image is merely transferred to output 38. Lenses 16 and 40, with equal focal lengths, form an imaging lens which has the property of providing an output image at point 39 that is inverted and reversed from the input image at point 22. Output image point 39 is displaced by displacement 48 from X-axis 12 in accordance with the relationship described in the discussions of Equation 1. Displacement 48 is equal in magnitude to displacement 24. In this way, the input image point 22 is inverted and reversed at output focal plane 42 at image point 39. That is, image point 22 on input focal plane 20 is imaged to output focal plane 42 at an equal but opposite displacement 48 from the optical center of lenses 16 and 40 represented by X-axis 12 of FIG. 2. This concept of spatial encoding of a signal's displacement into an angle during collimation and subsequent decoding of the angle to the displacement during decollimation of the beam can be used to route or switch optical signals to various output optical channels or fibers.

It is noted that while lenses 16 and 40 are both centered along X-axis 12 in FIG. 2, that the lenses need not be in alignment to form an imaging lens. Tilting either lens 16 or 40 with respect to X-axis 12 merely adds to an imaged signal's displacement on the output focal plane. In a like manner, translating either lens 16 or 40 with respect to X-axis 12 merely effects the coupling efficiency.

Figure 3A:
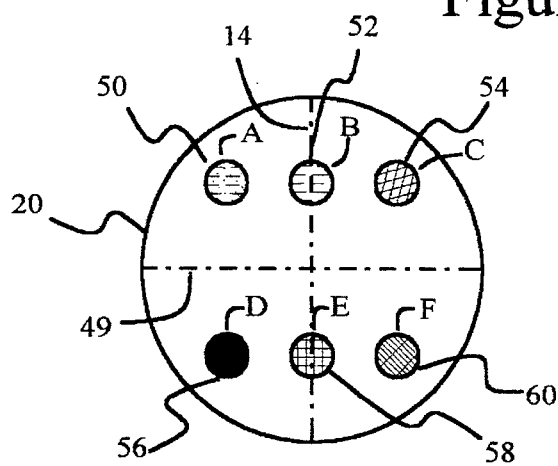
FIGS. 3A and 3B illustrate the input and output focal planes for the lenses in FIG. 2.
Figure 3B:
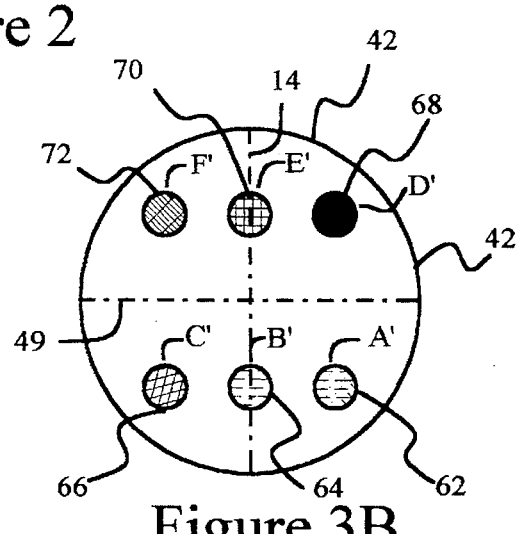

FIGS. 3A and 3B illustrate a possible configuration for input focal plane 20 and output focal plane 42 in FIG. 2, respectively. Focal plane 20 includes six input images, A through F. Input images A through F may be terminations for optical fibers. The inputs are arranged symmetrically about Y-axis 14 and Z-axis 49, which would be out of the page in FIG. 2. Input A is shown at position 50, Input B at position 52, Input C at position 54, Input D at position 56, Input E at position 58, and Input F at position 60. Shading has been used to differentiate the signals at each input.

FIG. 3B shows the configuration for output focal plane 42 of FIG. 2. As described in discussions related to FIG. 2, the images at input focal plane 20 have been inverted about Y-axis 14 and Z-axis 49 at output focal plane 42. In this manner, the outputs corresponding to the inputs of FIG. 3A, designated as the prime of the input, are imaged at output focal plane 42 at an opposite distance from Z-axis 49. Therefore, output focal plane 42 includes Output A' at position 62, Output B' at position 64, Output C' at position 66, Output D' at position 68, Output E' at position 70, and Output F' at position 72. It is noted that the shading of the inputs in FIG. 3A has been carried over to the outputs of FIG. 3B so that the corresponding output location for each input is easily identified. Therefore, Input A has the same shading as Output A', as do the other inputs and outputs for FIGS. 3A and 3B. Based on optical reciprocity, output focal plane 42 could be used as the input with input focal plane 20 forming the output.

Figure 4:
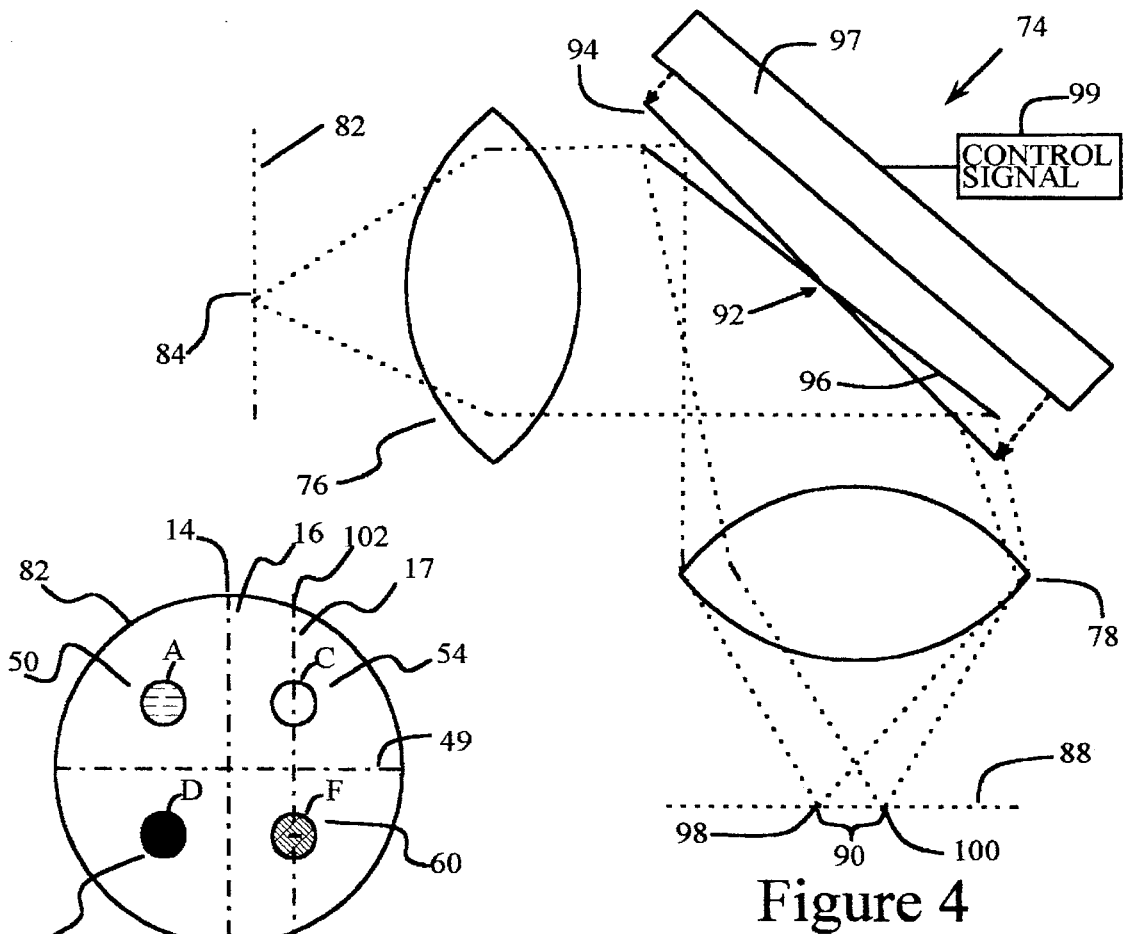
FIG. 4 depicts an embodiment of the present invention.

FIG. 4 illustrates an embodiment of the present inventive optical switch. Optical switch 74 includes a collimator or collimating lens 76 and a decollimator or decollimating lens 78. Input 84 is located on focal plane 82 of collimating lens 76. Output 90 is located on focal plane 88 of lens 78. Reflector 92 is positioned between lens 76 and 78. Reflector 92 has first position 94 and second position 96, and may be embodied in a flat mirror. Reflector 92 may be moved between positions 92 and 94 by actuator 97. Actuator 97 may comprise a piezo-electrical device that receives electrical control signal 99 that causes actuator 97 to move reflector 92 between the two positions. Moving reflector 92 between positions 94 and 96 changes the positions of outputs 90 between position 98 and 100, respectively. Several possible configurations for actuator 97 are described in U.S. Pat. No. 5,221,987, entitled FTIR Modulator, issued to Laughlin, the inventor of the present invention. U.S. Pat. No. 5,221,987 is expressly incorporated by reference.

Figure 5:
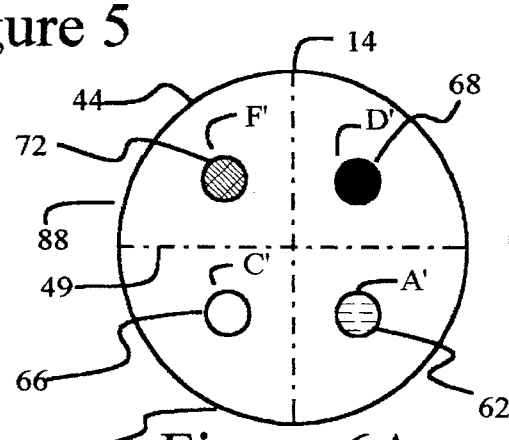
FIG. 5 illustrates the input focal plane of the optical switch of FIG. 4.

FIG. 5 shows a possible configuration for input focal plane 82 using the input references from FIG. 3A. Input focal plane 82 includes Input A at position 50, Input C at position 54, Input D at position 56, and Input F at position 60. The inputs of input focal plane 82 are shown centered along Y-axis 14 and Z-axis 49 for reference purposes only, it being understood that the inputs need not be centered nor axially aligned. Input B and E are not depicted for simplicity, but could be shown as in FIG. 3A. With reflector 92 in first position 94, the inputs are centered about Z-axis 14 as shown in FIG. 5. Moving reflector 92 to position 96 changes the centering of the inputs to virtual axis 102.

Figures 6A, 6B:
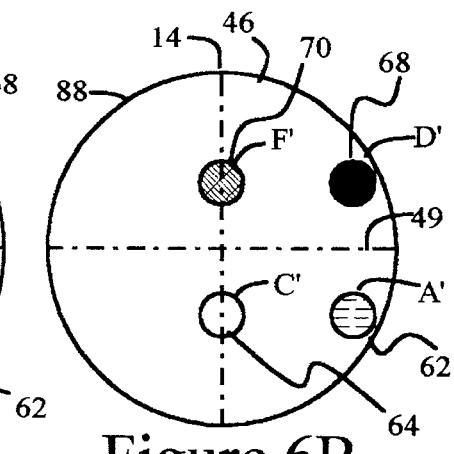
FIGS. 6A and 6B illustrate two configurations of the output focal plane of the optical switch of FIG. 4.

FIGS. 6A and 6B depict output focal plane 88 from FIG. 4 when reflector 92 is in its first and second positions, respectively. The output references from FIG. 3B shall be used in discussing output focal plane 88. FIG. 6A shows output focal plane 88 with reflector 92 in first position 94 with the outputs focused about Y-axis 14 and Z-axis 49. As previously described in connection with discussions on FIG. 2, input focal plane 82 is reimaged to output focal plane 88 by lenses 76 and 78 with the inputs inverted and reimaged about Y-axis 14 and Z-axis 49. In this way, Input A at position 50 is reimaged at Output A' at position 62, Input C is reimaged at Output C' at position 66, Input D is reimaged to Output D' at position 68, and Input F is reimaged to Output F' at position 72 in output focal plane 88.

Switching reflector 92 to second position 96 has the effect of changing the virtual center of input focal plane 82 in FIG. 5 to virtual centerline 102. A shift in the virtual center of input focal plane 82 causes a corresponding shift when the input images are reimaged on output focal plane 88. With reflector 92 in second position 94, the outputs at output focal plane 88 are centered about Z-axis 49. Using the reimaging concepts previously described, Input A is reimaged to Output A' at position 62, Input C is reimaged to Output C' at position 64, Input D is reimaged to Output D' at position 68, and Input F is reimaged to Output F' at position 70. The shading of inputs and outputs provides easy identification of the routing of the signals from input to output.

Switch 74 uses reflector 92 and the concepts of optical signal spatial encoding and imaging lenses to switch input signals to a number of output signals by virtually shifting the centerlines of lenses 76 and 78. The principal that an input image will be reimaged at an output in equal but opposite amounts about the centerline still applies, except that reimaging is done about a new virtual centerline. This allows for a shift in spatial position and also a rearrangement of the order of outputs when compared to the inputs. In this way, optical signals at input optical fibers terminated at input focal plane 84 may be routed to numerous output optical fibers terminated at output focal plane 88. It is noted that reflector 92 for switch 74 is shown with two positions for illustrative purposes only. Reflector 92 may have numerous positions each providing a different virtual axis for the lenses without departing from the inventive concepts of the present invention.

Figure 7:
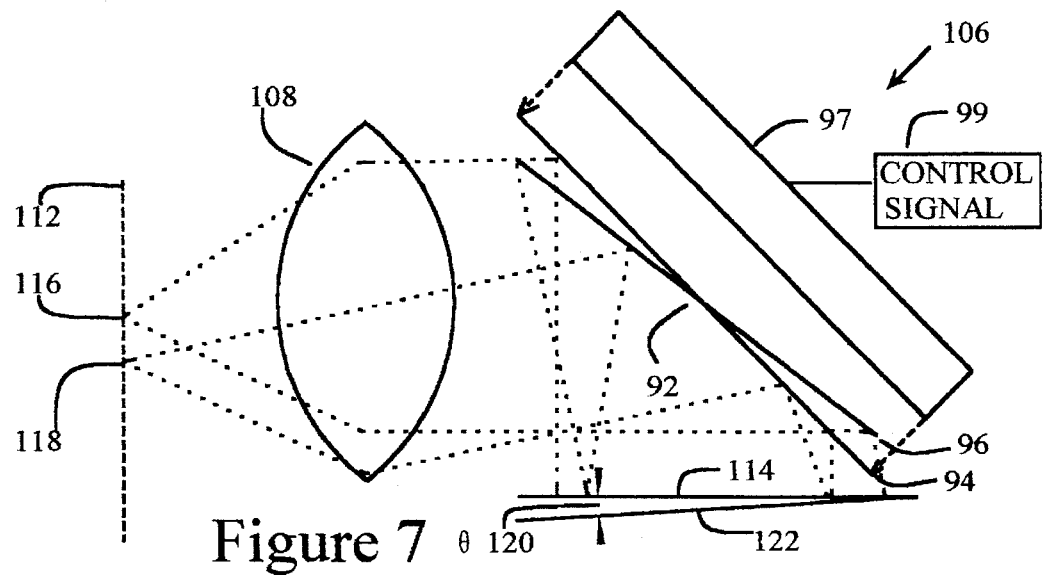
FIG. 7 depicts a single lens embodiment of the present invention.

FIG. 7 shows an alternate embodiment of the present invention using a single lens. Switch 106 includes lens 108 that both collimates and decollimates light beams. Focal plane 112 of lens 108 contains both the inputs and output signals for switch 106. The input signals to switch 106 are represented by point 116, and the output signals are represented by point 118, it being understood that the number of input and output signals are not limited to the number shown in FIG. 7. Switch 106 also includes reflector 92 having first position 94 and second position 96, actuator 97, and return reflector 114. The input signals represented by point 116 from focal plane 112 are collimated by lens 108 into collimated beams and reflected by reflector 92. The reflected collimated beams are directed to and reflected by return reflector 114. After reflection by return reflector 114, the collimated beams are again reflected by reflector 92. These signals are then decollimated by lens 108 to output signals represented in FIG. 7 as point 118 in focal plane 112.

In one embodiment of switch 106, return reflector 114 is at bias angle θ 120 with respect to surface 122, that is perpendicular to focal plane 112. Bias angle θ 120 can be used to provide a fixed offset for the position of the input and output signals in focal plane 112. In this way, the input signals represented by point 116 are spatially displaced in focal plane 112 to provide the output signals represented by point 118.

Figure 8A:
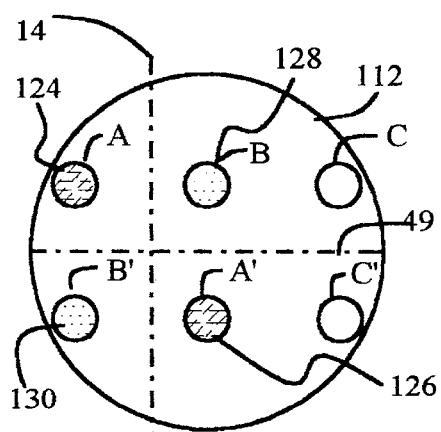
FIGS. 8A and 8B illustrate a configuration for the focal plane of the single lens optical switch of FIG. 7.
Figure 8B:
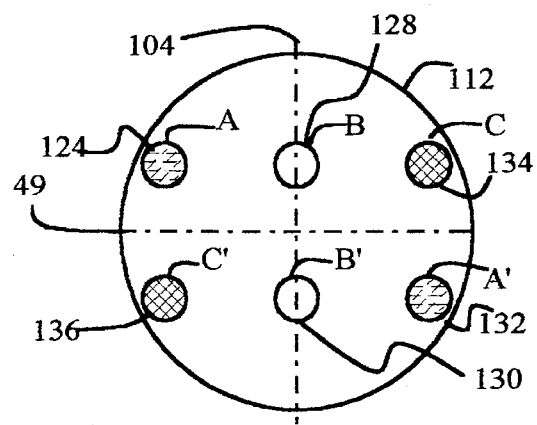

FIGS. 8A and 8B show focal plane 112 of switch 106 with reflector 92 in first position 94 and second position 96, respectively. FIG. 8A shows a possible configuration for focal plane 112 having multiple input signals and multiple output signals and with reflector 92 in first position 94. The input signals are represented by Input A, Input B, and Input C, while the outputs are represented by Output A', Output B', and Output C'. In the example of FIG. 8A with reflector 92 in first position 94, the input and output signals are centered about Y-axis 14 and Z-axis 49. In this way, Input A at position 124 is reimaged to Output A' at position 126, and Input B at position 128 is reimaged to Output B' at position 130. In this example, Input C and Output C' are shown inactive for the first position for reflector 92. (The position of Output C' if Input C were active is shown in FIG. 8A for reference purposes only.) Like shading on the associated inputs and outputs is provided for clarity.

Continuing the example of FIG. 8A, FIG. 8B shows the results when reflector 92 is moved to second position 96, causing focal plane 112 to shift to a virtual center about Y-axis 104. In this way, Input A is reimaged to Output A' at position 132, Input B at position 128 is reimaged to B' at position 130, and Input C at position 134 is reimaged to Output C' at position 136. By the process of optical reciprocity, the outputs of switch 106 can be the inputs and the inputs can be the outputs.

Figure 9:
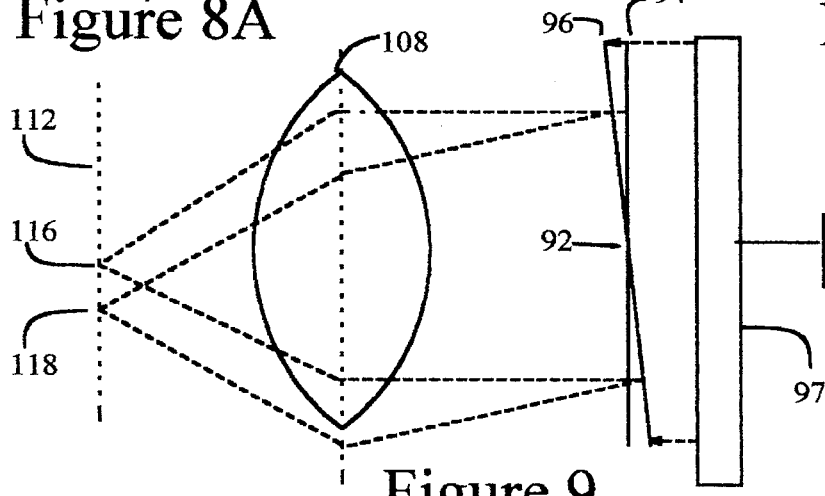
FIG. 9 depicts an alternate embodiment of a single lens optical switch.

FIG. 9 illustrates an alternate embodiment for optical switch 106 of FIG. 7. Switch 138 includes reflector 92 with positions 94 and 96 and eliminates the need for return reflector 114. Input signals from focal plane 112 represented by point 116 are collimated by lens 108. The collimated beams are reflected by reflector 92 and decollimated and focused by lens 108 to output signals represented by point 118 on focal plane 112. By moving reflector 92 between positions 94 and 96 with actuator 97, the virtual center of the inputs at point 116 and the outputs at point 118 can be modified for switching the inputs to outputs as shown and described in discussions relating to FIGS. 7 and FIGS. 8A and 8B.

It is noted that while shifts in a signal's path have been discussed in association with shifts about a single axis, that these shifts can take place about any or multiple axis without departing from the inventive concepts of the present invention.

Figure 10A:
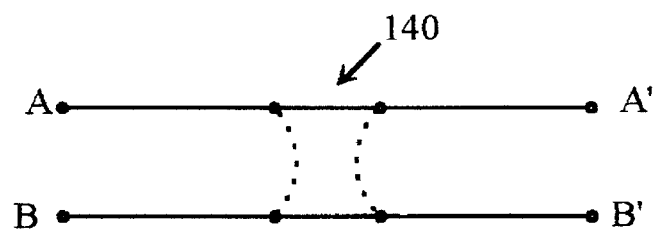
FIGS. 10A–10C illustrate an embodiment of the present invention configured for reversing bypass operation.
Figure 10B:
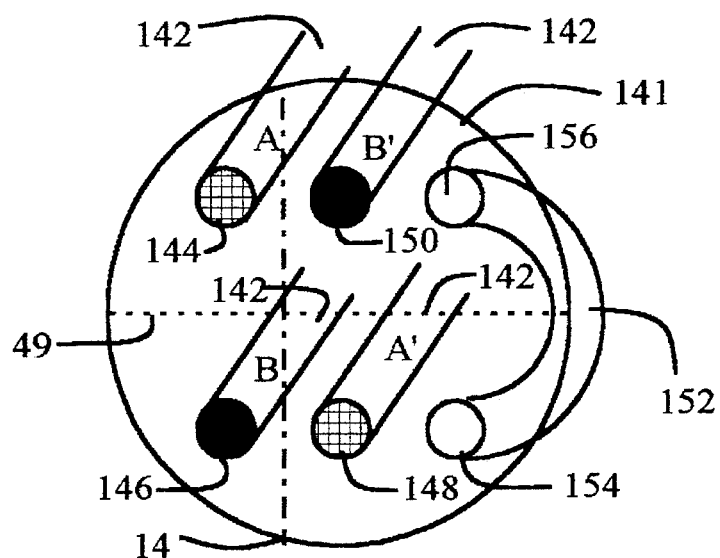
Figure 10C:
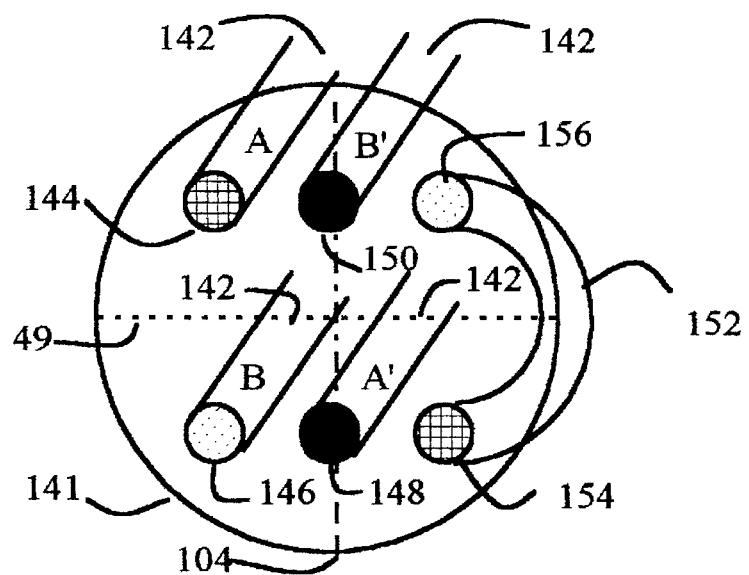

FIGS. 10A–10C show an alternate embodiment of the present switch configured to form a reversing bypass switch. FIG. 10A represents the function performed by reversing bypass switch 140. In the first position of switch 140, Input A couples to Output A' and Input B couples to Output B'. In the second position, Input A couples to Input B and Output A' couples to Output B'. Using, for example, switch 106 of FIG. 7, or switch 138 of FIG. 9, reversing bypass switch 140 may be provided using the concepts of the present invention.

Switch 106 of FIG. 7 may be configured to form reversing bypass switch 140 of FIG. 10A. By replacing lens 108 with an appropriate lens, such as a gradient index (GRIN) lens, allows switch 106 to provide a reversing bypass function.

FIG. 10B shows the focal plane associated with GRIN lens 141 that replaces lens 108 of switch 106 to form reversing bypass switch 140. By coupling optical fibers for feedback directly to the focal plane of GRIN lens 141, as shown in FIG. 10B, reversing bypass may be achieved. Optical fibers 142 may be coupled to lens 141 by an appropriate index matching adhesive to minimize energy loss or refraction as an optical signal goes from fiber 142 to lens 141. Optical fibers 142 provide Input A at position 144, Input B at position 146, Output A' at position 148, and Output B' at position 150. Return loop 152 provides a return path between positions 154 and 156, and may also be embodied in an optical fiber.

With reflector 92 of switch 106 of FIG. 7 in first position 94, focal plane 112, as depicted in FIG. 10B, is centered about Y-axis 14 and Z-axis 49. As previously described, Input A at position 144 is imaged to Output A' at position 148, and Input B at position 146 is imaged to Output B' at position 150. In this way, Input A is routed to Output A' and Input B is routed to Output B' as shown in FIG. 10A.

FIG. 10C shows the resulting shift in the virtual axis of focal plane 112 of lens 141 to Y-axis 104 and Z-axis 49 when reflector 92 of switch 106 is moved to second position 96. Input A at position 144 is imaged to the input of return loop 152 at position 154. Return loop 152 provides Input A to position 156 of return loop 152, that, in turn, is reimaged to Input B at position 146. Output A' at position 148 is reimaged to Output B' at position 150. In this way, Input A is routed to Input B and Output A' is routed to Output B' providing the second position of reversing bypass switch 140 of FIG. 10A.

In a similar manner, switch 138 of FIG. 9 can be modified to provide reversing bypass switch 140.

FIGS. 11A through 11d show an embodiment of the present invention configured to form cross-bar switch 158. In its first position, Input A couples to Output A' and Input B couples to Output B'. In the second position of switch 158, Input A couples to Output B' and Input B couples to Output A'.

Figure 11A:
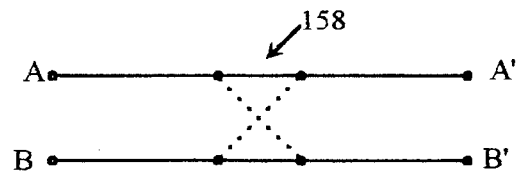
FIGS. 11A–11D show an embodiment of the present invention configured for cross-bar switching.
Figure 11B:
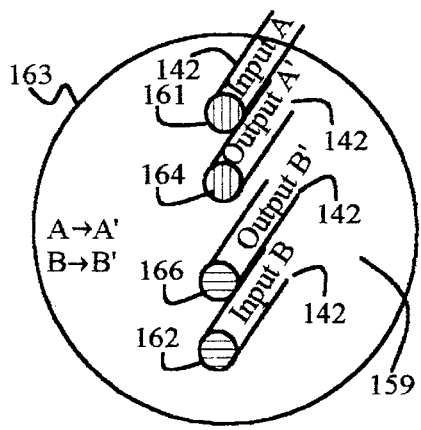

Optical switch 74 of FIG. 4 may be configured to form cross-bar switch 158. For switch 74, using an appropriate lens such as a GRIN lens for lens 76 and 78 allows switch 74 to provide the cross-bar function. Lens 76 may be embodied in GRIN lens 159, and lens 78 may be embodied in GRIN lens 160. FIG. 11B shows input focal plane 163 associated with GRIN lens 159. Fibers 142 are coupled directly to focal plane 163 of GRIN lens 159 as previously described in connection with discussions of FIGS. 10B and 10C. Input focal plane 163 includes Input A at position 161, Input B at position 162, Output A' at position 164, and Output B' at position 166.

Figure 11C:
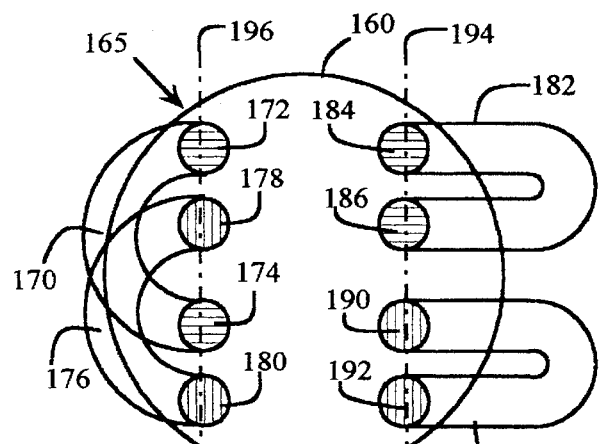

FIG. 11C shows the fiber configuration at focal plane 165 of second lens GRIN 160, including first return loop 170 coupling positions 172 and 174, second return loop 176 coupling positions 178 and 180, third return loop 182 coupling positions 184 and 186, and fourth return loop 188 coupling position 190 and position 192. The return loops may be embodied in optical fibers and may be coupled to focal plane 165 associated with lens 160 by an index matching adhesive as previously described.

With reflector 92 in first position 94, the input signals from lens 159 are imaged at line 194 in focal plane 165 associated with lens 160. In this way, Input A at position 161 is imaged to position 192 on fourth return loop 188. Loop 188 provides Input A to position 190 which, in turn, is reimaged to position 164 at Output A'. Input B at position 162 is imaged to position 184 on third return loop 182. Loop 182 provides Input B to position 186 which, in turn, is reimaged to position 166 at Output B'. In this first position, therefore, Input A is coupled to Output A' and Input B is coupled to Output B'.

Figure 11D:
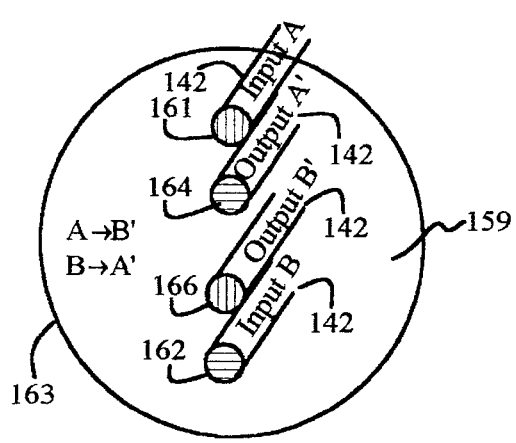

Moving reflector 92 to second position 96 causes the input signals from lens 159 to be imaged at line 196 on focal plane 165 of lens 161. FIGURE 11d shows focal plane 82 with return lens 160 focused about line 196. Input A at position 161 is imaged to position 180 of second return loop 176. Loop 176 provides Input A to position 178 which, in turn, is reimaged to position 166 at Output B'. Input B at position 162 is imaged to position 172 of first return loop 170. Loop 170 provides Input B to position 174 which, in turn, is reimaged to position 164 at Output A'. In this manner, Input A is coupled to Output B' and Input B is coupled to Output A'.

Cross-bar switch 158 may be accomplished by looping return fibers from focal plane 165 of lens 160 to focal plane 163 of lens 159. An example of a configuration of the present invention utilizing return fiber between lenses will be described in discussions related to FIGS. 19–19C below.

The present invention as described in discussions on FIGS. 4–11D accomplishes switching optical signals between input fibers and output fibers through shifting one or more virtual axis of the system by changing the position of a reflector between multiple positions. Shifting the virtual axis of an image can also be accomplished by the concept of frustrated total internal reflection (FTIR).

When light travels from a denser medium, such as glass, into a less dense medium, such as air, the angle of the light in the less dense medium is greater than when in the denser medium. Total internal reflection is the phenomenon whereby light traveling at an angle in the denser medium will be perfectly reflected by the interface between the denser and less dense medium. This perfect reflection or total internal reflection may be frustrated by bringing a second refractor into proximal contact with the reflecting surface of the denser medium. The term "proximal contact" will be further defined in discussions related to FIG. 18. The light traveling in the denser medium will pass through the reflecting surface and travel into the second refractor. This is the concept of frustrated total internal reflection (FTIR).

FTIR is described in U.S. Pat. No. 5,221,987. The present invention employing FTIR routes the optical energy from one or more input fibers to a plurality of output fibers. The switch routes the energy by frustrating the total internal reflection in the switch by a variable but controlled amount.

Figure 12:
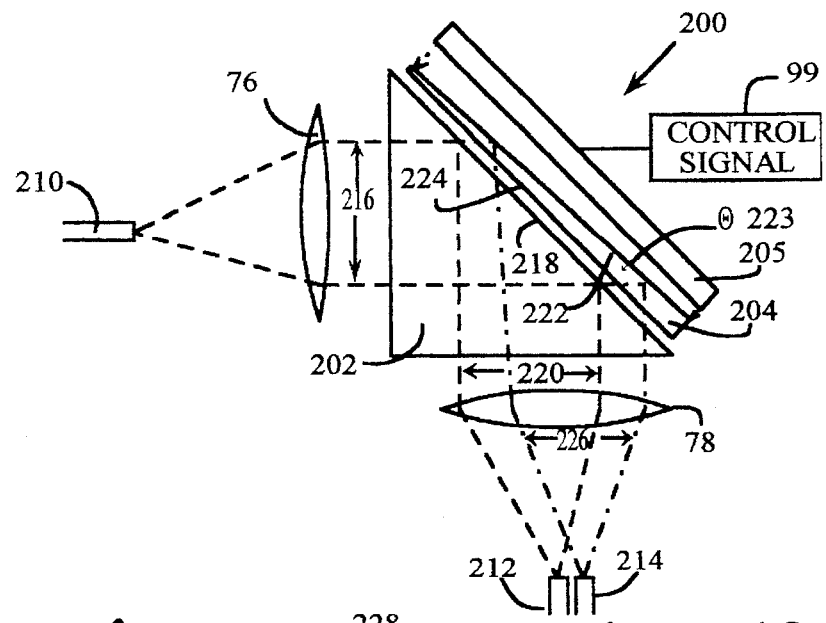
FIG. 12 illustrates an embodiment of the present invention employing frustrated total internal reflection (FTIR)

FIG. 12 illustrates an embodiment of the present optical switch utilizing FTIR. FTIR optical switch 200 includes collimator 76 and decollimator 78 that may be lenses. Switch 200 includes refractor 202 positioned between lenses 76 and 78. Refractor 202 is a right angle prism in the embodiment of switch 200 of FIG. 12, it being understood that other configurations for refractor 202 may be suitable for switch 200 without deviating from the inventive concepts of the present inventions. Switch 200 also includes a second refractor or switchplate 204 that is used to frustrate total internal reflection in refractor 202. Switch 200 also includes actuator 205 for moving switchplate 204 into proximal contact with refractor 202. In one embodiment of switch 200, actuator 205 is a piezo-electrical device. Configurations for actuator 205 may be found in U.S. Pat. No. 5,221,987. Input signals are provided to switch 200 by input fiber 210 located in the focal plane for lens 76, and output signals are provided to output fibers 212 and 214 located at the focal plane for lens 78.

In the first position of switch 200, switchplate 204 does not touch refractor 202. The energy from input fiber 210 is collimated into beam 216 by collimating lens 76 and beam 216 is introduced into refractor 202. Collimated input beam 216 is reflected at reflecting surface 218 of refractor 202 by total internal reflection (TIR) and forms primary collimated output beam 220. Primary collimated output beam 220 is focused by decollimating output lens 78 and to first output optical fiber 212.

To accomplish switching from input optical fiber 210 to second output optical fiber 214, switchplate 204 is brought into proximal contact with reflecting surface 218 of refractor 202 by actuator 205. This frustrates the total internal reflection in refractor 202 resulting in input collimated beam 216 being transmitted into switchplate 204. Collimated beam 216 is reflected from reflective surface 222 of switchplate 204 by total internal reflection as secondary collimated output beam 226. It is noted that total internal reflection at reflective surface 222 is not always necessary.

Reflective surface 222 of switchplate 204 is at a bias angle θ 223 to inside surface 224 of switchplate 204. Secondary collimated output beam 226 leaves refractor 202 at an angle of two times angle 223 θ to that of primary collimated output beam 220. Secondary collimated output beam 226 is then reimaged by output lens 78 onto second output optical fiber 214. By this method, an optical signal at input optical fiber 210 can be switched between output optical fibers 212 and 214 by moving switchplate 204 into and out of proximal contact with refractor 202. When switchplate 204 is not in proximal contact with refractor 202, the optical signal from input optical fiber 210 is imaged to first output optical fiber 212. When switchplate 204 is brought into proximal contact with refractor 202, total internal reflection in refractor 202 is frustrated, thereby causing the optical signal from input optical fiber 210 to be imaged to second output optical fiber 214.

Controlling the spacing between switchplate 204 and refractor 202 controls the frustration of the total internal reflection by refractor 202. The reflections at reflective surface 218 when frustrated by surface 224 are developed from field theory and have been well defined. The reflection at reflective surface 218 of refractor 202 of switchplate 204 is defined as:

$$R = 1 - 1/[a * \sinh(y)^2 + \beta] \quad (2)$$

$$y = 2*\pi*n_1*(d/\lambda)*[(n_0/n_1)^2*\sin(\phi)^2 - 1]^{-\frac{1}{2}} \quad (3)$$

$$a_s = \frac{[(n_0/n_1)^2 - 1]*[(n_2/n_0)^2*(n_0/n_1)^2 - 1]}{4(n_0/n_1)^2\cos(\phi)[(n_0/n_1)^2\sin(\phi)^2 - 1]*[(n_2/n_0)^2 - \sin(\phi)^2]^{-1/2}} \quad (4)$$

$$a_p = a_s\{[(n_0/n_1)^2 + 1]*\sin(\phi)^2 - 1\}^2 \quad (5)$$

$$\beta_s = \frac{\{[(n_2/n_0)^2 - \sin(\phi)^2]^{-1/2} + (n_2/n_0)^2\cos(\phi)\}^2}{4(n_2/n_0)^2\cos(\phi)[(n_2/n_0)^2 - \sin(\phi)^2]^{-1/2}} \quad (6)$$

$$\beta_p = \frac{\{[(n_2/n_0)^2 - \sin(\phi)^2]^{1/2} + (n_2/n_0)^2\cos(\phi)\}^2}{4(n_2/n_0)^2\cos(\phi)[(n_2/n_0)^2 - \sin(\phi)^2]^{-1/2}} \quad (7)$$

where: The subscripts, s and p, refer to waves polarized perpendicular to and parallel to the plane of incidence, respectively.

θ=the angle from the normal in refractor 202 at reflective surface 218;

$n_0$=the index of refraction of refractor 202.

$n_1$=the index of refraction for the medium between refractor 202 and switchplate 204.

$n_2$=the index of refraction of switchplate 204.

Figure 18:
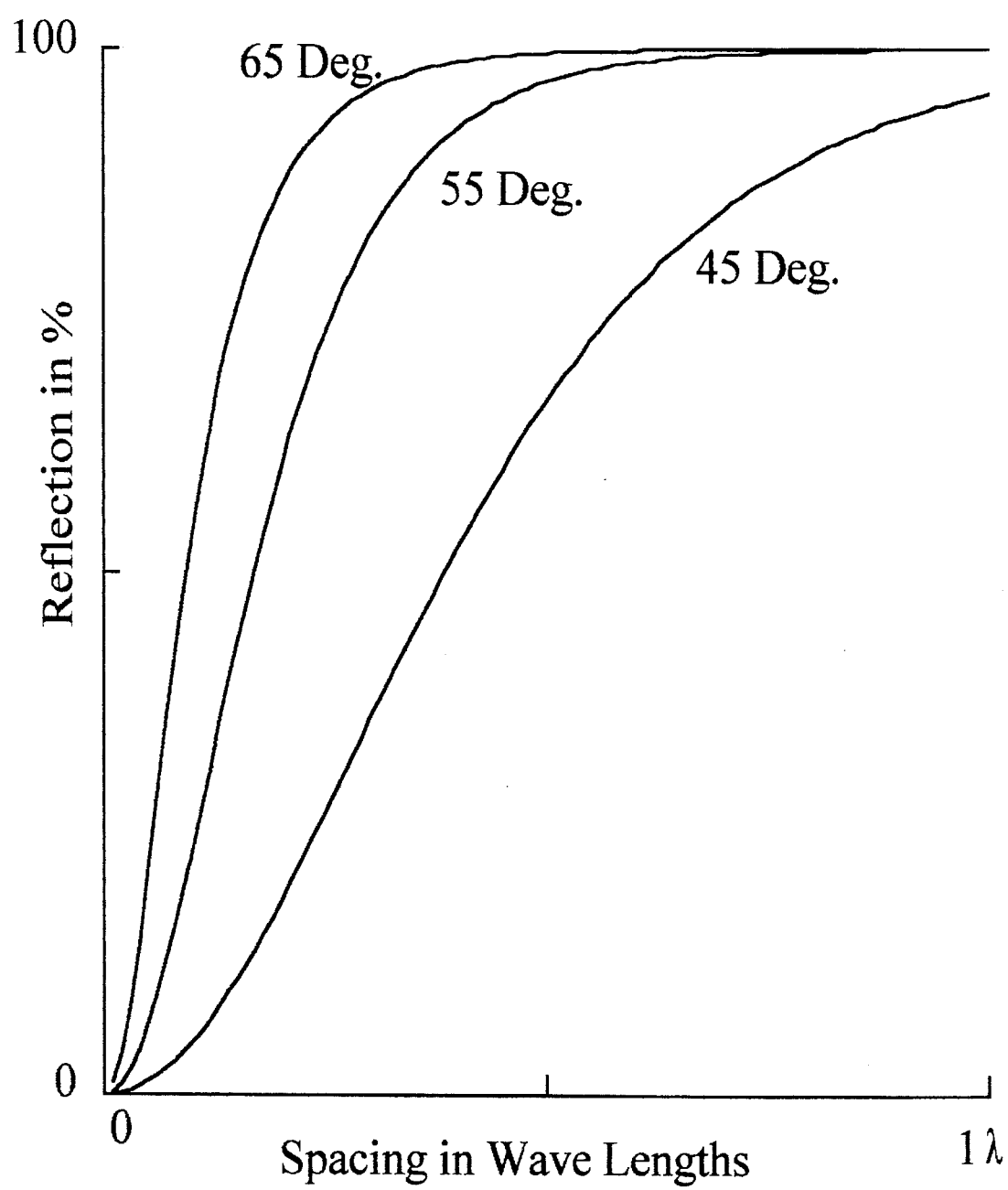
FIG. 18 presents a graph of frustrated total internal reflections as a function of spacing and angle of incidence.

FIG. 18 illustrates the reflection at reflective surface 218 of refractor 204 as a function of the spacing between surface 218 and surface 224 for several typical angles to be encountered at surface 222 and as a function of the spacing between refractor 202 and switchplate 204. FIG. 18 demonstrates that the degree of frustration of the total internal reflection within refractor 202 is a function of the spacing between refractor 202 and switchplate 204. Therefore, by bringing switchplate 204 into proximal contact with refractor 202 (as defined by Equations (2) through (7) and FIG. 18) controls the portion of the collimated beam that is reflected by refractor 202 and the portion reflected by switchplate 204.

Alternatively, by varying the spacing between refractor 202 and switchplate 204, an input optical signal from input optical fiber 210 may be variably split between output optical fibers 212 and 214 forming a signal splitter. In a similar manner, switch 200 may be used to variably attenuate an input signal to either output optical fibers 212 and 214.

In the preferred embodiment, lenses 76 and 78 are GRIN lenses. Input optical cable 210 may be coupled directly to lens 76 and output optical cables 210 and 214 may be coupled directly to lens 78 by the techniques previously identified when using GRIN lenses.

The operation of switch 200 has been described as having an unswitched position with switchplate 204 removed from refractor 202 and a switched position when switchplate 204 is brought into proximal contact with refractor 202. With this configuration, switch 200 does not employ FTIR in reflector 202 when unswitched and does when switched. It is noted that the operation of switch 200 can be reversed without departing from the inventive concepts of the present invention. For example, the unswitched condition for switch 200 can be established to be when switchplate 204 is in proximal contact with refractor 202 causing FTIR and the switched condition of switch 200 would be when switchplate 204 is removed from refractor 202 and FTIR in refractor 202 does not occur. The choice of switched and unswitched conditions for switch 200 does not affect its performance.

Additionally, actuator 205 of switch 200 has been thus far described as moving switchplate 204 into and out of proximal contact with refractor 202. Actuator 205 may be embodied in any of the transducers described in U.S. Pat. No. 5,221,987 without departing from the inventive concepts of the present invention. Actuator 205 can be used to move switchplate into and out of proximal contact with refractor 202 depending on the configuration of the optical switch. In this way, actuator 205 controls the spacing between refractor 202 and switchplate 204.

Figure 13A:
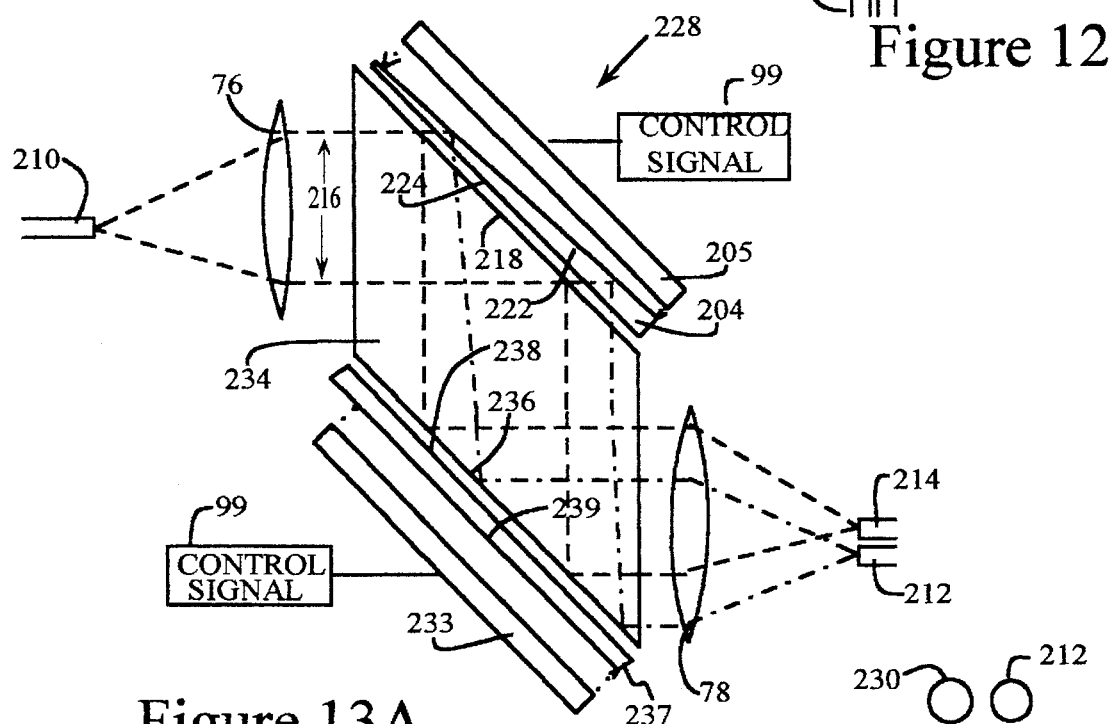
FIGS. 13A and 13B show a cascade of two switches of FIG. 12 to provide a 1×4 switch.

FIG. 13A shows an alternate embodiment of the present invention using FTIR to switch a single input optical fiber to multiple output optical fibers. Switch 228 includes collimating lens 76 and decollimating lens 78. The input to switch 228 is provided by input optical fiber 210 and the output is provided by output optical fibers 212 and 214 shown, and fibers 230 and 232 hidden in the view of FIG. 13A (see FIG. 13B). Switch 228 includes refractor 234 in the form of back to back prisms or a rhomboid. Refractor 234 has first reflective surface 218 and second reflective surface 236. Switch 228 has two switchplates, including switchplate 204 and switchplate 237, and two actuators, including actuator 205 and actuator 233.

Figure 13B:
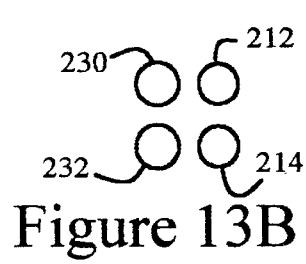

The operation of switch 228 of FIG. 13A is similar to that described for switch 200 of FIG. 12. By bringing switchplate 204 into contact with first reflective surface 218 of refractor 234, total internal reflection at first reflective surface 218 within refractor 234 is frustrated, so that the optical signal traveling in refractor 234 is shifted, as previously described in discussions of FIG. 12. In a similar manner, bringing switchplate 237 into contact with second reflective surface 236 of refractor 234, frustrates total internal reflection in refractor 234 shifting the optical signal traveling at second reflecting surface 236 in refractor 234. Once total internal reflection is frustrated at second reflecting surface 236, the optical signal in refractor 234 will travel through inside surface 238 of switchplate 236 to reflective surface 239 where the signal is reflected. Switchplate 237 may also have a bias angle (not explicitly shown) similar bias angle $\theta$ 223 on switchplate 205. The bias angle on switchplate 237 may be in the same plane as bias angle $\theta$ 223 on switchplate 205. In the preferred embodiment, however, the bias angle on switchplate 237 is perpendicular to bias angle $\theta$ 223, and, therefore, into the page. By this technique, switchplate 204 provides two positions for the optical signal traveling in refractor 234, and switchplate 237 provides two positions for the optical signal traveling in refractor 234. This allows an input beam from input optical fiber 210 to be switched to four output optical fibers. A possible configuration for the four output optical fibers 212, 214, 230, and 232 is shown in FIG. 13B.

It is noted that optical switches 200 and 228 shown in FIGS. 12 and 13A, respectively, may be cascaded, and that each cascade provides additional signal routing positions. In this way, an optical signal at input optical fiber 210 may be switched to any one of numerous output optical fibers. It is also noted that the number of switches incorporating the present invention that may be cascaded is not limited to the embodiments shown.

Figures 14A, 14B:
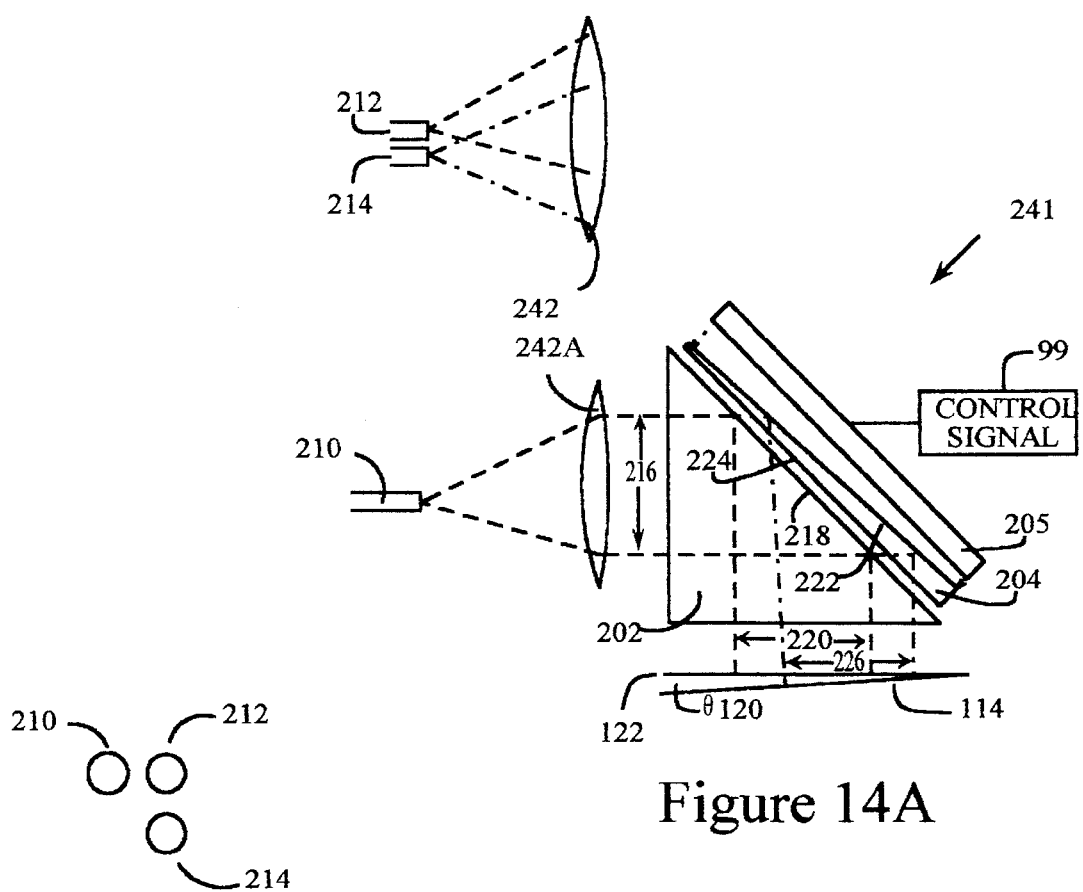
FIGS. 14A and 14B show an embodiment of a 1×2 fiber optic switch.

FIG. 14A illustrates another embodiment of the present invention. Switch 241 of FIG. 14A is similar to switch 106 of FIG. 7 and includes refractor 202, switchplate 204 and actuator 205 similar to switch 200 of FIG. 12. Switch 241 also employs collimating and decollimating lens 242. An input optical signal is provided to switch 241 by input optical fiber 210, and the output signal is provided to output optical fibers 212 and 214. Similar to optical switch 106 of FIG. 7, switch 241 uses return reflector 114 shown displaced from refractor 202. Return reflector 114 may also have bias angle $\theta$ 120 with respect to perpendicular surface 122. It is noted that return reflector 114 may be embodied in refractor 202 without departing from the inventive concepts of the present invention.

Input optical fiber 210 provides an image to lens 242, which, in turn, provides collimated input beam 216 to refractor 202. With switchplate 208 removed from reflecting surface 218 of refractor 202, collimated beam 216 reflects from surface 218 by total internal reflection and travels to return reflector 114. Bias angle 120 of return reflector 114 causes a shift in the return beam (not explicitly shown). The return beam is then again reflected by reflecting surface 218 and travels back to lens 242a that decollimates and focuses the return beam to first output optical fiber 212. Lens 242a is shown offset from lens 242 for illustrative purposes only. Lens 242a may be lens 242 that both collimates the input image and decollimates the return optical signal. For some applications of the present invention, it may be desirable to have separate collimating lens 242 and separate decollimating lens 242a.

To switch the output from output optical fiber 212 to output optical fiber 214, switchplate 204 is brought into contact with reflecting surface 218 of refractor 202. This frustrates the total reflection in refractor 202 and causes beam 216 to reflect from reflecting surface 222 of switchplate 204. As described in discussions for FIG. 12, this causes a shift in the return beam that is focused by lens 242a to output optical fiber 214.

In this way, an input signal may be switched between two or more output fibers with a single lens. This eliminates the need and expense of a second lens making switch 241 less expensive.

Figure 15:
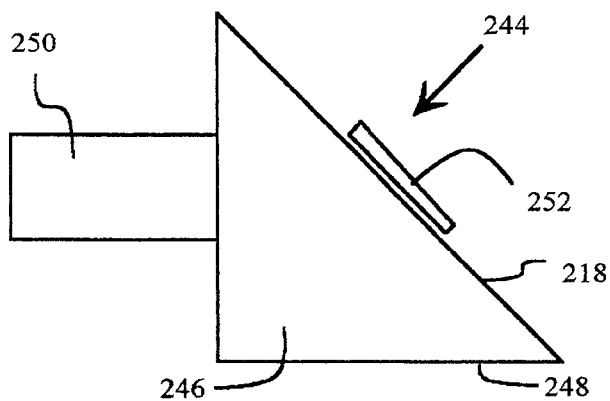
FIG. 15 illustrates an embodiment of the present invention employing a single lens.

FIG. 15 shows another embodiment of the present invention configured as a reversing bypass switch. Switch 244 of FIG. 15 is similar to switches 200 and 241 of FIGS. 12 and 14A, respectively. Switch 244 includes refractor 246 in a right angle prism embodiment. Refractor 246 has reflective surface 248 for providing a return beam. Switch 244 has lens 250 which both provides the input signals and receives the output signals. Lens 250 may be a GRIN lens having fibers coupled thereto as previously described in connection with the discussions on FIGS. 10B and 10C. Switch 244 has switchplate 252 which is similar to the previously identified switchplates and an actuator (not explicitly shown) for moving switchplate 252. Reflecting surface 248 of refractor 246 may have a slight bias angle in order to provide a fixed offset in the return beam when routing an optical signal between input and output.

In operation of switch 244 of FIG. 15, input signals are collimated by lens 250 and the collimated signals reflect by total internal reflection at reflective surface 218 to reflective surface 248. A bias on reflective surface 248 will cause a fixed offset in the collimated signals that are returned to reflective surface 218 and on back to lens 250. Details on the operation of switch 244 will be described in connection with FIGS. 10B and 10C. When switchplate 252 is not in contact with surface 218 of refractor 246, Input A at position 144 is routed to Output A' at position 148, and Input B at position 146 is routed to Output B' at position 150 as depicted in FIG. 10B. Bringing switchplate 252 into contact with reflecting surface 218 of refractor 246 frustrates total internal reflection in refractor 246 causing a shift in the output beam as previously described and depicted in FIG. 10C. In this way, Input A at position 144 is imaged to the input of return loop 152 at position 154. Return loop 152 provides the image to position 156, that, in turn, is reimaged to Input B at position 142. Output A' at position 148 is imaged to Output B' at position 150. In this way, Input A is coupled to Input B and Output A' is coupled to Output B' forming the second position for reversing bypass switch 140.

Figure 16:
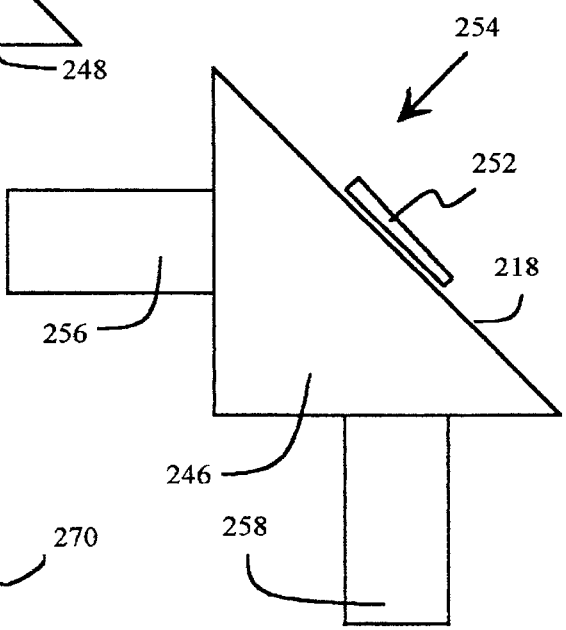
FIG. 16 shows an embodiment of the present invention employing two lenses.

FIG. 16 depicts another embodiment of the present invention configured as a cross-bar switch. Switch 254 of FIG. 16 is very similar to switches 200 and 241 of FIGS. 12 and 14A, respectively, and provides a cross-bar function as previously described in connection with discussions of FIGS. 11A–11D. Switch 254 includes refractor 246, switchplate 252, an actuator (not explicitly shown), and lenses 256 and 258. Lens 256 of switch 254 may be configured similar to lens 82 of FIGS. 11B and 11D, and lens 258 may be configured similar to lens 160 of FIG. 11C. Lenses 256 and 258 may be embodied in GRIN lenses as previously described.

In operation of switch 254, input optical signals are provided by lens 256 to refractor 246. These signals are reflected by reflecting surface 218 to lens 258. Lens 258 reflects the signals by employing return loops as previously described for lens 160. The reflected signals are also reflected by reflective surface 218 and back to lens 256. Additional details on the operation of switch 254 of FIG. 16 will be described using FIGS. 11B–11D. When switchplate 252 is not in contact with surface 218 of refractor 246, Input A at position 161 is imaged to position 192 of fourth return loop 188. Return loop 188 provides the image to position 190, which, in turn, is reimaged to Output A' at position 164. Input B at position 162 is imaged to position 184 of third return loop 182 that provides this image to position 186. The image at position 186 is then reimaged to Output B' at position 166. In this way, Input A is coupled to Output A' and Input B is coupled to Output B'.

In order to accomplish cross-bar switching, switch-plate 252 may be brought into contact with surface 218 of refractor 248. This frustrates total internal reflection in refractor 246 causing a shift in the image as previously described. Input A at position 161 is then imaged to position 180 of second return loop 176. Loop 176 provides the image to position 178, which, in turn, is reimaged to Output B' at position 166. In a similar manner, Input B at position 162 is imaged to position 172 of first return loop 170. Loop 170 provides the image to position 174, which, in turn, is reimaged to Output A' at position 164. In this manner, Input A is coupled to Output B' and Input B is coupled to Output A' forming the second position of cross-bar switch 158.

Figure 17:
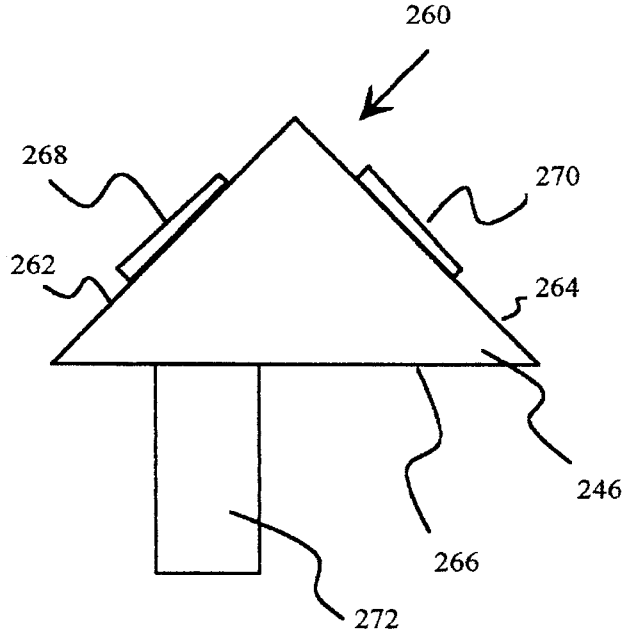
FIG. 17 illustrates an alternate embodiment of the present invention for double action switching.

FIG. 17 shows another embodiment of the present invention providing a multiposition switch. Switch 260 includes refractor 246 having total internal reflecting surfaces 262, 264, and reflective surface 266. Switch 260 also includes switch plates 268 and 270. The input and output to switch 260 is provided by lens 272 at surface 266 of refractor 246. An input signal provided by lens 272 will be reflected in refractor 246 by FTIR surfaces 262, 264, and reflective surface 266. Providing a bias angle (not explicitly shown) on surface 266 will cause a shifting of the signal as an output at lens 272. Independently moving switchplates 268 an 270 into contact with refractor 246 can accomplish switching of optical signals provided by lens 272 as previously described for switches 200, 228, 241, 244, and 254. It should be recognized that the reflective surface 266 can be replaced with an output lens, and that refractor 246 may be cascaded to provide compounded switching.

Figure 20:
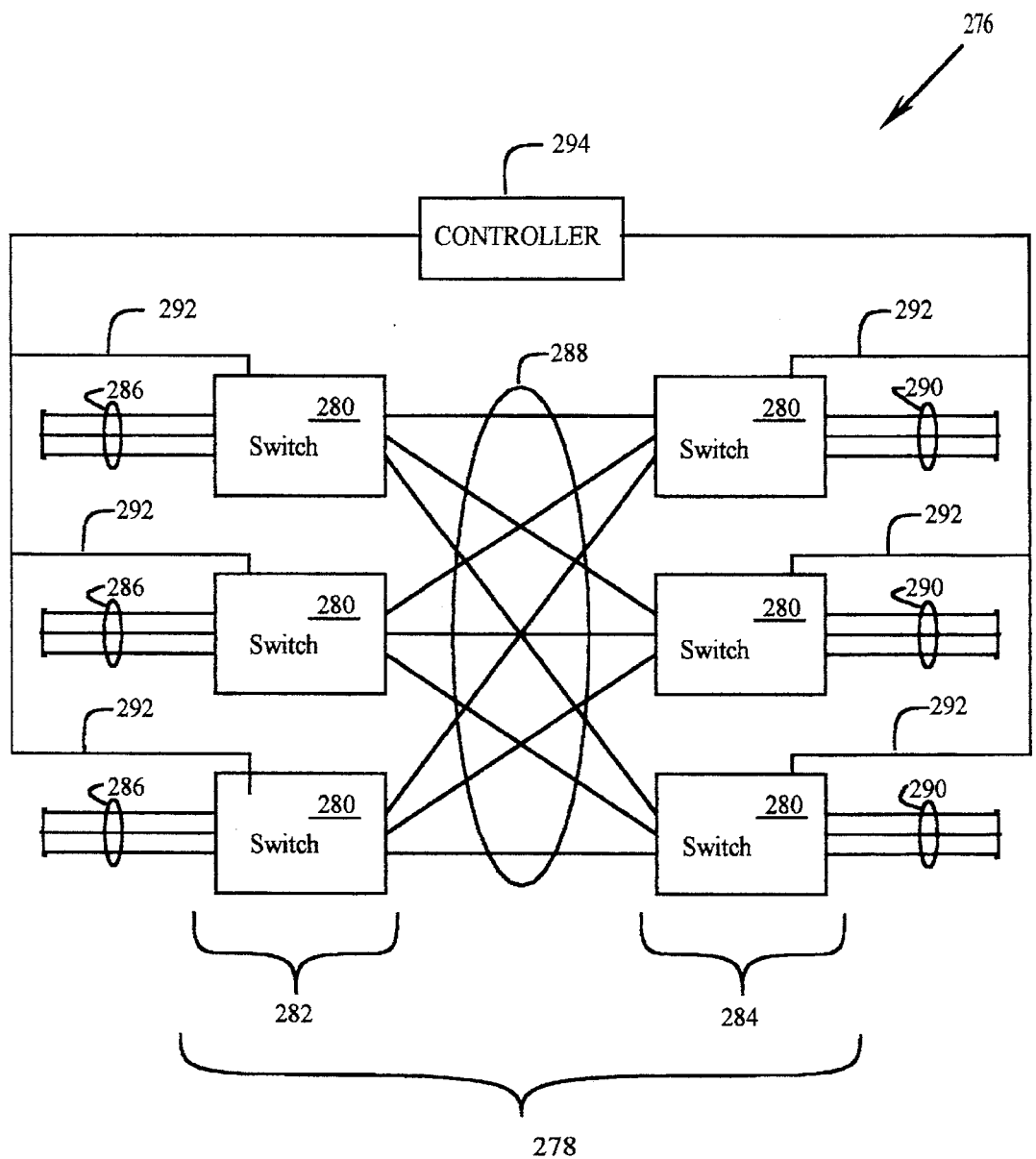
FIG. 20 illustrates a switch array employing the present invention.

FIG. 20 shows switching system 276 employing switch array 278. Individual switches 280 of array 278 may be embodied in the present invention for switching optical signals. To further describe system 278, first stage 282 will be referred to as the input and second stage 284 of array 278 will be referred to as the output, it being understood that signals may travel in both directions in system 276. Each switch 280 in stage 282 includes multiple inputs 286 which may be optical fibers. Each switch 280 in stage 282 is coupled to individual switches 280 of second stage 284 by intermediate couplings 288. Intermediate couplings 288 may also be embodied in optical fibers. Each switch 280 of second stage 284 provides output optical signals 290, which may also be embodied in optical fibers. It is noted that the number of input 286, output 290, and intermediate 288 couplings need not be limited to the number shown in FIG. 18.

In operation of system 276, each switch 280 of first stage 282 switches an input signal to the appropriate intermediate coupling 288. The signal on the intermediate coupling is then switched by one of the individual switches 280 in second stage 284 to an appropriate output. Each switch 280 receives control signal 292 from controller 294. Controller 294 sets the position of each switch by triggering the actuator in each switch so that optical signals are routed between inputs and outputs in the appropriate path. Switching system 276 of FIG. 20 shows that the present invention can be used to build a multistage switching system for processing optical signals.

Figure 19A:
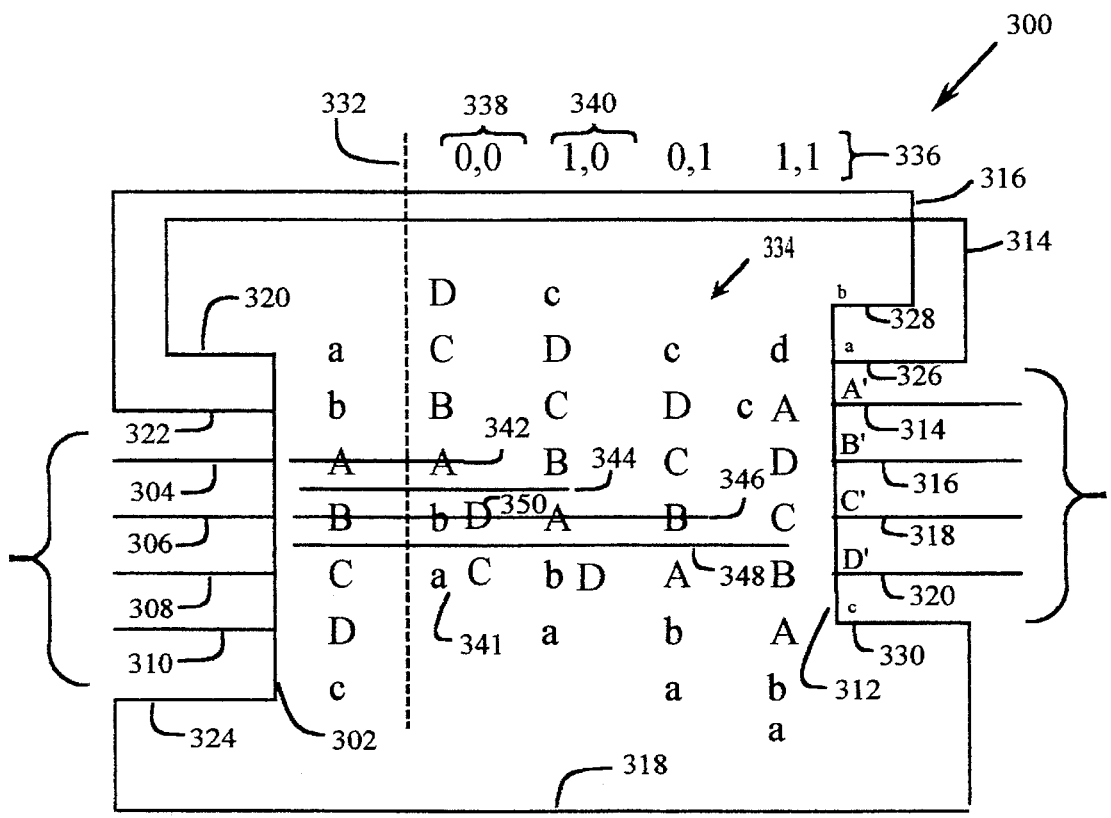
FIGS. 19A–19C illustrate a 4×4 cross-bar switch configuration employing the present invention.
Figure 19B:
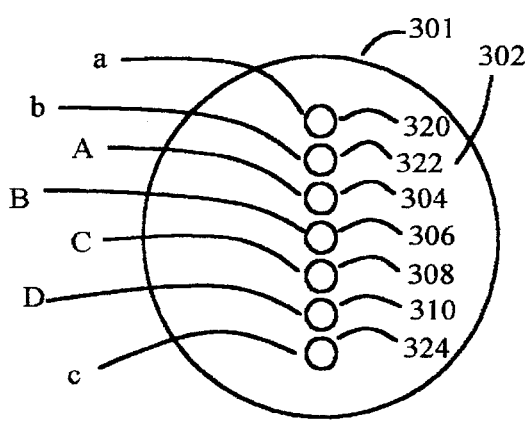
Figure 19C:
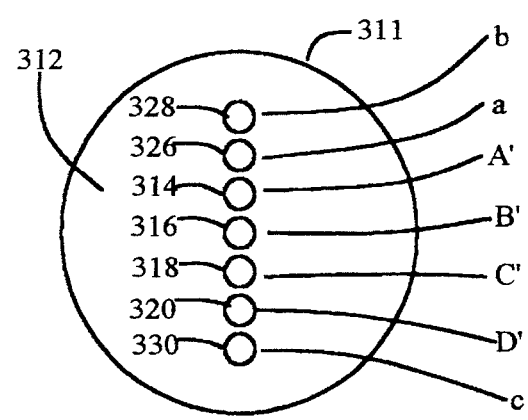

FIGS. 19A–19C illustrate a 4×4 cross-bar switch that may be implemented using the concepts of the present invention. In a cross-bar switch, each of four inputs can be routed to each of four outputs. Switch 300 of FIGS. 19A–19C can be implemented using any two lens embodiment of the present invention previously discussed. Switch 228 of FIG. 13A is one embodiment of the present invention that may be used to implement cross-bar switch 300 of FIG. 19A–19C. Switch 300 requires a switch that has two lens&s and two switchplates in order to achieve switching four inputs to any one of four outputs.

FIG. 19B represents a possible configuration for the input focal plane associated with lens 76 in FIG. 13A. In the preferred embodiment, lens 76 is GRIN lens 301 having associated focal plan 302. The inputs at focal plane 302 are designated as Input A at position 304, Input B at position 306, Input C at position 308, and Input D at position 310. Each of these inputs may be provided to focal plane 302 of lens 301 by, for example, an optical fiber. The optical fiber may be attached to lens 301 by an appropriate index matching adhesive as has been previously described for coupling optical fibers to a GRIN lens.

FIG. 19C represents the configuration for the output focal plane associated with lens 78 in FIG. 13A. In the preferred embodiment, lens 78 is GRIN lens 311 having focal plane 312. Output focal plane 312 of lens 311 includes Output A' at position 314, Output B' at position 316, Output C' at position 318, and Output D' at position 320. Each of the output locations on lens 311 has an optical fiber appropriately coupled to it.

FIG. 19A represents the relationships between input focal plane 302 and output focal plane 312 for cross-bar switch 300. To achieve the combinations of the signals in switch 300, return loops a 314, b 316, and c 318 are required. Each of the return loops will route a signal received at output focal plane 312 back to input focal plane 302 so that operation of cross-bar switch 300 may be achieved.

Returning to FIGS. 19B and 19C, a configuration for the orientation of the return loops with the inputs and outputs is shown. On input focal plane 302, return loop a 314 is at position 320, return loop b 316 is at position 322, and return loop c 318 is at position 324. The corresponding configuration for the return loops in output focal plane 312 are shown in FIG. 19C. Return loop a 314 is at position 326, return loop b 316 is at position 328, and return loop c 318 is at position 330.

FIG. 19A also demonstrates how the imaging of signals within cross-bar switch 300 occurs. Vertical axis 332 is provided as a reference between the location of the inputs on input focal plane 302 and the outputs on output focal plane 312. Matrix 334 has been superimposed on switch 300 to aid in explaining the routing of signals from input focal plane 302 to output focal plane 312. Row 336 represents the condition of switch 300. As previously noted, switch 300 may be implemented with two switchplates. The condition of the switchplates is represented by the pair of numbers in row 336. For example, the condition 0,0 represents switch 300 with both switchplates open, with open being set arbitrarily with switchplate in proximal contact with the refractor, it being understood that open could be set for when the switchplate is not in proximal contact with the refractor. Therefore, for example, in column 338, the designation 0,0 refers to both switches as open, and in column 340, 1,0 refers to the first switchplate closed and the second switch open. The remaining columns of matrix 334 are self explanatory.

The horizontal lines in matrix 334 illustrate the virtual axis for the signals for the switch for the four switch positions of row 336. Axis 342 is the virtual axis for the switch in 0,0 state, virtual axis 344 is the virtual axis for the switch in state 1,0, virtual axis 346 is the virtual axis for the switch in state 0,1, and virtual axis 348 is the virtual axis for the switch in state 1,1.

The entries within matrix 334 represent the position on output focal plane 312 that the inputs from input focal plane 302 are imaged to. For example, for switch state 0,0, Input A at position 304 is aligned with virtual axis 342 so it is not displaced about virtual axis 342, and is aligned with position 316 on output focal plane 312. Input A, therefore, couples to Output B' at position 316. Input B at position 306 is imaged about virtual axis 342 to position 314, and, therefore, couples to Output A'. Input C at position 308 is imaged about virtual axis 342 to position 326 to return loop a 314. Return loop a 314 provides this signal back to position 320 of input focal plane 302. Return loop a at position 320 is imaged about virtual axis 342 to position 318 on output focal plane 312 and couples position 320 to Output C'. Therefore, Input C couples to Output D'. The entry "aC" at position 341 in matrix 334 indicates that Input C is provided to position 320 by return loop a 314. Input D at position 310 is imaged about virtual axis 342 to position 328 at the input of return loop b 316. Return loop b 316 provides the signal back to input focal plane 302 at position 322. Position 322 is then reimaged about virtual axis 342 to position 318 at Output C' of output focal plane 312. Therefore, Input D couples to Output C'. In this way, with switch 300 in state 0,0, each input is coupled to a different output.

Matrix 334 helps understand how the inputs from input focal plane 302 are imaged to the outputs on output focal plane 312. In a similar manner, the other states of switch 300 can be tracked using matrix 334 so that each input may be switched to a different output without blocking.

Switch 300 of FIG. 19A–19C provides a technical advantage of a cross-bar switch using the present invention. Switch 300 may also be put into an array of switches to provide, for example, a 16×16 non-blocking cross-bar switching of signals.

It is noted that the present invention may have numerous applications, including, but not limited to: laser Q-switching applications, as a laser safety device, and as an electric chopper wheel. Additionally, the present invention may provide switching of RF signals. By using larger scale materials that are transparent to RF signals, advantages of the present invention may be achieved for processing RF signals.

The present invention for routing optical signals provides technical advantages of low cost and fast switching speeds. The present invention may use a common mirror or the concept of frustrated total internal reflection to achieve shifts in a virtual focal plane of an image. In this way, an optical signal can be switched, attenuated, modulated or split between various outputs.

Although the present invention has been described in detail, it should be understood that various changes, substitutions and alterations can be made hereto without departing from the spirit and scope of the invention as defined by the appended claims.

What is claimed is:

1. An apparatus for switching an input optical signal to one of a plurality of output optical locations, the apparatus comprising:

a collimating lens for collimating the input optical signal into a collimated beam;

a reflector for reflecting the collimated beam, the reflector having a plurality of positions for changing the angle of the collimated beam by a selected amount to direct the collimated beam to a selected one of the output optical locations; and a decollimating lens separate from the collimating lens and the reflector for decollimating and focusing the collimated beam to the selected output optical location.

2. The apparatus of claim 1 wherein the collimating lens comprises a GRIN lens.

3. The apparatus of claim 1 wherein the decollimating lens comprises a GRIN lens.

4. The apparatus of claim 1 wherein the reflector comprises a mirror.

5. The apparatus of claim 1 further comprising an actuator responsive to a control signal for moving the reflector between the plurality of positions.

6. The apparatus of claim 5 wherein the actuator comprises a piezo-electrical device.

7. An apparatus for switching an input optical signal to one of a plurality of output optical locations, the apparatus comprising:

a lens for collimating the input optical signal into a collimated beam;

a return reflector for reflecting the collimated beam; and a reflector for reflecting the collimated beam after reflection by the return reflector, the reflector having a plurality of positions for changing the angle of the collimated beam by a selected amount to direct the collimated beam to a selected one of the output optical locations.

8. The apparatus of claim 7 wherein the lens is further operable to decollimate and focus the collimated beam to the selected output optical location after reflection by the return reflector and the reflector.

9. The apparatus of claim 7 wherein the lens comprises a GRIN lens.

10. The apparatus of claim 7 wherein the return reflector and the reflector comprise mirrors.

11. The apparatus of claim 7 further comprising an actuator responsive to a control signal for moving the reflector between the plurality of positions.

12. The apparatus of claim 11 wherein the actuator comprises a piezo-electrical device.

13. An apparatus for switching a plurality of input optical signals to a plurality of output optical locations, the apparatus comprising:

a collimating lens for collimating each input optical signal into a collimated beam;

a reflector for reflecting each collimated beam, the reflector having a plurality of positions for changing the angle of each collimated beam by a selected amount to direct each collimated beam to a selected one of the output optical locations; and a decollimating lens separate from the collimating lens and the reflector for decollimating and focusing each collimated beam to the selected output optical location.

14. The apparatus of claim 13 further comprising a return loop coupled to the collimating lens and decollimating lens, the return loop operable to route an optical signal from the decollimating lens to the collimating lens.

15. The apparatus of claim 13 wherein the collimating lens comprises a GRIN lens.

16. The apparatus of claim 13 wherein the decollimating lens comprises a GRIN lens.

17. The apparatus of claim 13 wherein the reflector comprises a mirror.

18. The apparatus of claim 13 further comprising a return loop having a first end and a second end, both the first end and second end are coupled to the decollimating lens, the return loop operable to route an optical signal from the first end to the second end.

19. The apparatus of claim 13 further comprising an actuator responsive to a control signal for moving the reflector between the plurality of positions.

20. The apparatus of claim 19 wherein the actuator comprises a piezo-electrical device.

21. The apparatus of claim 13 further comprising:

a first return loop having a first end coupled to a first selected output optical location and a second end coupled to the decollimating lens;

a second return loop having a first end coupled to a second selected output optical location and a second end coupled to the decollimating lens; and the first return loop and the second return loop operable to route an optical signal from their respective first end to their respective second end.

22. An apparatus for switching a plurality of input optical signals to a plurality of output optical locations, the apparatus comprising:

a lens for collimating each input optical signal into a collimated beam;

a return reflector for reflecting each collimated beam; and a reflector for reflecting each collimated beam after reflection by the return reflector, the reflector having a plurality of positions for changing the angle of each collimated beam by a selected amount to direct each collimated beam to a selected one of the output optical locations.

23. The apparatus of claim 22 wherein the lens is further operable to decollimate and focus each collimated beam to the selected output optical location after reflection by the return reflector and the reflector.

24. The apparatus of claim 22 wherein the return reflector and reflector comprise mirrors.

25. The apparatus of claim 22 further comprising an actuator responsive to a control signal for moving the reflector between the plurality of positions.

26. The apparatus of claim 22 wherein the actuator comprises a piezo-electrical device.

27. The apparatus of claim 22 further comprising a return loop having a first end and a second end, both the first end and second end are coupled to the lens, the return loop operable to route an optical signal from the first end to the second end.

28. The apparatus of claim 27 wherein the first end of the return loop is coupled to the selected one of the output optical locations.

29. A method for switching an input optical signal to one of a plurality of output optical locations, the method comprising:

collimating the input optical signal into a collimated beam using a collimating lens;

changing the angle of the collimated beam by a selected amount using a movable reflector, the movable reflector having a plurality of positions with each position changing the angle of the collimated beam by a selected amount to direct the beam to a selected one of the output optical locations; and decollimating and focusing the collimated beam to the selected one of the output optical locations using a decollimating lens separate from the collimating lens and the reflector after the changing the angle step.

30. A method for switching an input optical signal to one of a plurality of output optical locations, the method comprising:

collimating the input optical signal into a collimated beam;

changing the angle of the collimated beam by a selected amount by, first reflecting the collimated beam with a reflector having a plurality of positions, each position changing the angle of the collimated beam by a selected amount, and second reflecting the collimated beam with a return reflector after the first reflecting step to direct the collimated beam to the reflector; and decollimating and focusing the collimated beam to one of the output optical locations after the changing the angle step.

31. A method for switching a plurality of input optical signals to a plurality of output optical locations, the method comprising:

collimating each of the input optical signals into a collimated beam using a collimating lens;

changing the angle of each collimated beam by a selected amount with a reflector having a plurality of positions with each position changing the angle of the collimated beams by a selected amount to direct each collimated beam to a selected one of the output optical locations; and decollimating and focusing each collimated beam to the selected one of the output optical locations using a decollimating lens separate from the collimating lens and the reflector after the changing the angle step.

32. A method for switching a plurality of input optical signals to a plurality of output optical locations, the method comprising:

collimating each of the input optical signals into a collimated beam;

changing the angle of each collimated beam by,
first reflecting each collimated beam with a reflector having a plurality of positions, each position changing the angle of each collimated beam by a selected amount, and
second reflecting each collimated beam with a return reflector after the first reflecting step to direct each collimated beam to the reflector; and decollimating and focusing each collimated beam to one of the output optical locations after the changing the angle step.

33. A system for switching a plurality of input optical signals to a plurality of output optical signals, the system comprising;

a switch array comprising a plurality of switches, each switch comprising:

an optical input and a plurality of optical outputs;

a collimating lens for collimating an optical signal from an input into a collimated beam; and a reflector for reflecting the collimated beam and having a plurality of positions for changing the angle of the collimated beam by a selected amount in order to direct the collimated beam to a different one of the switch's outputs, each position corresponding to one of the switch's outputs; and a decollimating lens separate from the collimating lens and the reflector for decollimating and focusing the collimated beam to one of the switch's outputs; and a controller for controlling the switching of optical signals within each switch in the switch array so that each input optical signal is directed to a desired output optical signal.

34. The system of claim 33 wherein the switch array is organized into first and second switch stages.

35. A system for switching a plurality of input optical signals to a plurality of output optical signals, the system comprising;

a switch array comprising a plurality of switches, each switch comprising:

an optical input and a plurality of optical outputs;

a lens for collimating an optical signal from the input into a collimated beam; and a reflector for reflecting the collimated beam and having a plurality of positions for changing the angle of the collimated beam by a selected amount in order to direct the beam to a different one of the switch's outputs, each position corresponding to one of the switch's outputs, wherein the reflector further comprises:

a first refractor having a first reflective surface for reflecting the collimated beam by total internal reflection;

a second refractor having a contact surface and a reflective surface;

wherein the second refractor's contact surface is operable to frustrate the total internal reflection of the collimated beam by the first refractor's first reflective surface when the second refractor is brought into proximal contact with the first refractor and so that the collimated beam enters the second refractor; and wherein the second refractor's reflective surface is operable to reflect the collimated beam and to change the angle of the collimated beam by a selected amount in order to direct the beam to a different one of the switch's outputs; and a controller for controlling the switching of optical signals within each switch in the switch array so that each input optical signal is directed to a desired output optical signal.

* * * * *